Jan. 22, 1957
B. STORSAND
2,778,890
ARRANGEMENT FOR THE SAFETY GROUNDING OF
VEHICLES WITH INERTIA MASS IMPULSION
Filed Jan. 31, 1952
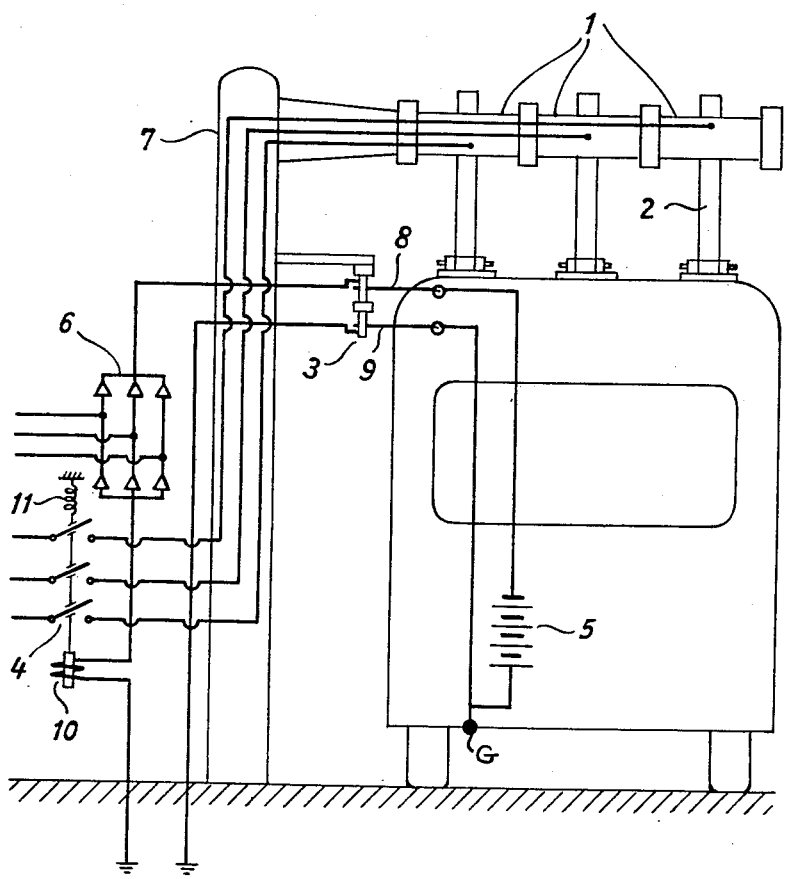
INVENTOR,
Bjarne Storsand,
BY

United States Patent Office 2,778,890
Patented Jan. 22, 1957

---

2,778,890

ARRANGEMENT FOR THE SAFETY GROUNDING OF VEHICLES WITH INERTIA MASS IMPULSION

Bjarne Storsand, Zurich, Switzerland, assignor to Ateliers de Construction Oerlikon, Zurich-Oerlikon, Switzerland, a corporation of Switzerland Application January 31, 1952, Serial No. 269,272

Claims priority, application Switzerland February 26, 1951

3 Claims. (Cl. 191—1)

This invention relates to the safety grounding of vehicles having inertia mass propulsion, of the character illustrated and described in applicant's co-pending application, Serial No. 192,399, now Patent No. 2,626,673.

In vehicles which are impelled by the amount of energy stored in a rotating inertia mass and in which the inertia mass is speeded up at the stops by supplying electric energy by means of an electric motor, it is important that the vehicle is grounded during the charging operation so as to prevent accidents in the case of insulation defects. This precaution is necessary where the energy for the charge is supplied by a rotary current network having either a grounded zero point or dissimilar phase insulations, and furthermore in the case of direct current networks with grounded poles or grounded return lines.

In the present invention a multipolar ground contact is arranged across which flows, after grounding has been accomplished, a low tension current which actuates a switch of the lead-in of the fixed charging contacts.

On account of this the fixed charging contacts on the charging mast are "cold," i. e., dead, and receive voltage only when the vehicle is grounded. It is also possible to charge the storage battery of the vehicle for the auxiliary circuits, lighting, etc., across the ground contacts. This may be effected by means of a source of direct current at the charging point (e. g., a rectifier). This simplifies the electric equipment of the vehicle, and the charging of the battery proceeds automatically together with the charging of the flywheel energy accumulator.

More particularly, according to the present invention, there is provided at a vehicle charging station a stationary charging mast 7 comprising a plurality of fixed charging contacts 1 that are normally "cold" along with insulated leads thereto from a normally open three-phase switch 4 which is connected to a suitable source of supply of electrical energy by "hot" lines. Such switch is biased open by a spring 11, and closed by an electromagnet 10 when the winding of the latter is energized. Such winding is included in a grounding control circuit which also includes a battery charging rectifier 6. The winding and switch constitute a relay which is located at the station. Also located at such station, and included in the control circuit, is a ground contact means 3 with which the grounding contacts 8, 9, carried by the vehicle, engage. The control circuit also includes the storage battery 5 carried by the vehicle.

Thus, when a vehicle stops at said station, movable charging contacts 2 carried by the vehicle engage the corresponding stationary charging contacts 1, and grounding contacts 8, 9, also carried by the vehicle, engage said stationary ground contact terminals 3. This causes the vehicle to be grounded and establishes a complete circuit which includes the rectifier 6 and the electro-magnet 10, as well as the storage battery 5 of the vehicle. As a result, the electro-magnet is energized and the switch 4 is closed thereby. Closure of the switch energizes the charging contacts 1 which lead to the electric motor of the vehicle and recharge the rotating inertia mass thereof. At the same time the rectifier 6 at the station recharges the storage battery 5 of the vehicle. When the vehicle leaves the charging station the grounding circuit opens, the electro-magnet 10 automatically de-energizes, and the spring 11 opens the switch 4, leaving the charging contacts 1 at the station "cold," or dead.

In the annexed diagrammatic drawing, which represents an embodiment of the invention, 1 shows three fixed charging contacts situated on an axis on a charging mast 7. 2 indicates the movable contacts on the vehicle. 3 is a ground contact, 4 a switch of the lead-in of the fixed charging contacts, 5 the battery for the auxiliary circuits of the vehicle and 6 a source of direct current for charging it.

As soon as the two contacts 8 and 9 touch the ground contact 3 the magnet of the switch 4 is excited and the lead-ins of the charging contacts 1 are closed. If the ground is interrupted the switch 4 is opened by means of a tension spring which interrupts the current to the charging contacts 1.

Having thus described my invention, I claim:

1. In an automatic safety grounding mechanism for a vehicle provided with a rotating mass drive, in which the rotating mass is revolved rapidly at a stopping point by energy derived from a stationary current supply line, the combination of a plurality of stationary charging contacts at said stopping point arranged next to one another and connectable to the current supply line through a switch, a plurality of principal contacts on the vehicle adapted to connect with corresponding ones of said stationary charging contacts, stationary ground contacts at said stopping point, a pair of ground contacts mounted on the vehicle and adapted to engage said stationary ground contacts, a storage battery carried by the vehicle, a control circuit including said stationary and vehicle-mounted ground contacts and an electro-magnet and said storage battery, said control circuit being completed only when said vehicle-mounted ground contacts engage said stationary ground contacts, a spring normally holding said switch open, and means operatively connecting said electro-magnet to said switch to close said switch whenever said control circuit is completed.

2. In an automatic safety grounding mechanism as defined in claim 1, the combination therein set forth, wherein said control circuit includes a stationary charging means for said battery, operative when said control circuit is completed.

3. In an automatic safety grounding mechanism as defined in claim 1, the combination therein set forth, wherein said stationary charging contacts and said stationary ground contacts are carried by a fixed charging mast located at said stopping point.

References Cited in the file of this patent

UNITED STATES PATENTS

| 1,787,850 | Wolf | Jan. 6, 1931 |
| 2,454,164 | Harder | Nov. 16, 1948 |
| 2,589,453 | Storsand | Mar. 18, 1952 |
| 2,626,673 | Storsand | Jan. 27, 1953 |

FOREIGN PATENTS

| 913,452 | France | Sept. 11, 1946 |
| 600,359 | Germany | July 21, 1934 |
| 69,101 | Sweden | Mar. 26, 1930 |